Feb. 15, 1966    E. S. CAIN, JR., ETAL    3,235,274
SHAFT SEAL
Filed Dec. 14, 1962
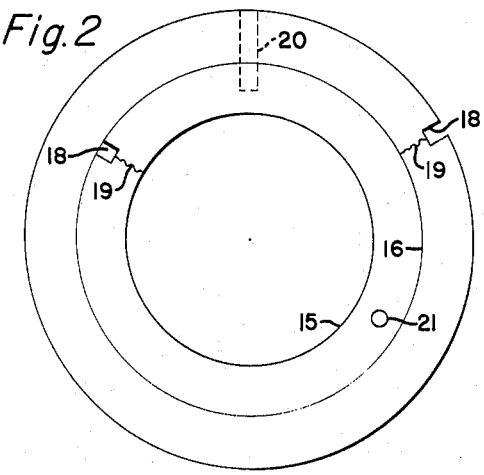
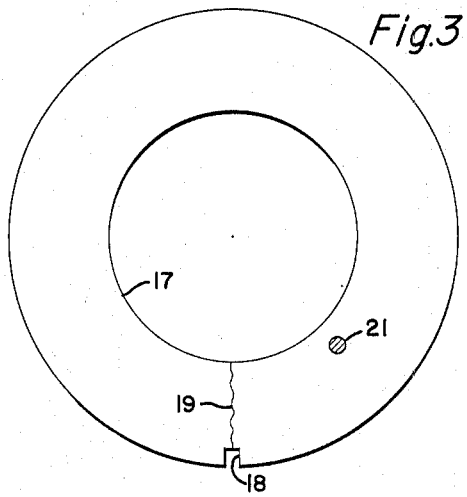
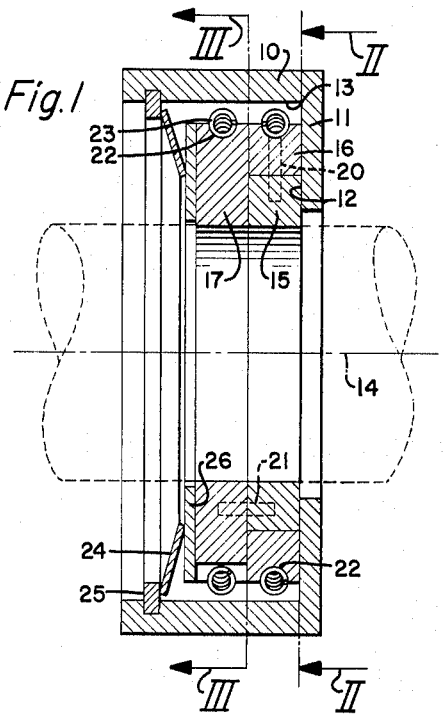
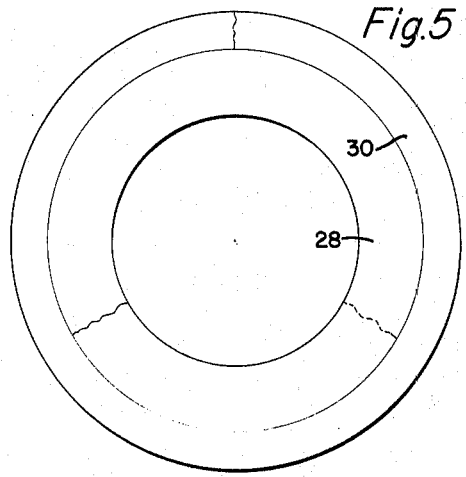
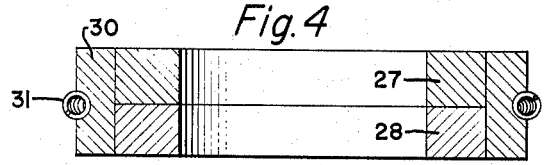
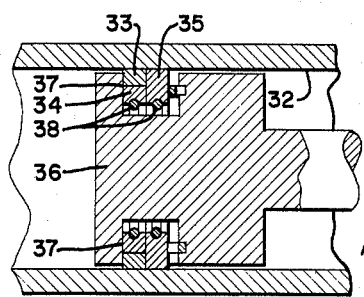
INVENTORS
EARL S. CAIN JR.
BY GENE L. GREEN
Herschel C. Omohundro
ATTORNEY

United States Patent Office 3,235,274
Patented Feb. 15, 1966

3,235,274
SHAFT SEAL
Earl S. Cain, Jr., Palo Alto, Calif., and Gene L. Green, Phoenix, Ariz., assignors to The Garrett Corporation, Los Angeles, Calif., a corporation of California
Filed Dec. 14, 1962, Ser. No. 244,832
9 Claims. (Cl. 277—142)

This invention relates generally to seals and is particularly directed to means for providing a seal along a rotatable shaft such as is used in a gas turbine engine, in a valve, or on a linearly moving piston in which pressure differences exist at regions spaced longitudinally of the shaft. One of the problems involved in the building and operation of these contrivances is to successfully prevent leakage of fluids along the rotating shaft where it extends through walls or partitions. These fluids are frequently at different pressures and temperatures, both of which may tend to cause rapid or premature deterioration of the elements used to close the openings around the shafts. The elements are frequently subject to wear due to relative rotary movement in normal operation as well as oscillatory movement caused by inaccuracies in machining, assembly and vibration incident to operation.

Seals for performing the above-mentioned function have heretofore been provided, but they have been open to the objections of being expensive to fabricate, extremely liable to excessive wear, and difficult to maintain in operating condition and to service.

It is an object of this invention to provide a seal which will minimize leakage, wear, premature deterioration, and other objections noted above.

It is also an object of this invention to provide a seal mechanism having a minimum number of parts and which is so constructed that its efficiency will improve with use.

A further object of the invention is to provide a seal mechanism having a plurality of sealing elements composed of suitable material which elements fit together to minimize, as much as possible, the paths along which fluid seepage may occur, the material of the sealing elements being such as will resist high temperatures and will wear into close fitting or conforming shapes when in sustained engagement with relatively movable parts.

A still further object of the invention is to provide a shaft seal mechanism having a casing containing the sealing elements proper, the latter constituting a plurality of ring members so constructed that they can be contracted into close engagement with the shaft to be sealed and so arranged relative to one another and the casing that the flow of fluid therebetween will be substantially prevented.

Another object of the invention is to provide a shaft seal mechanism having a casing containing a plurality of ring members which are severed by fracturing or in other suitable manners along a substantially radially extending line, the fracture providing for the contraction diametrically of the rings into firm seating engagement with the shaft and a most intimate interfitting or matching of the separated ends produced by the fracture, the number of potential leakage paths being maintained at a desirable minimum by limiting the fractures to but one per ring, such construction also serving to hold the manufacturing cost of the seal at a minimum.

Other objects and advantages of the invention will be made apparent by the following description considered in conjunction with the accompanying drawing in which forms of seals embodying the invention are illustrated.

In the drawing:

FIG. 1 is an axial sectional view taken through a seal mechanism formed in accordance with the invention, the shaft being shown in dotted lines;

FIG. 2 is a front elevational view of two of the sealing ring elements employed in the seal mechanism shown in FIG. 1, the view being taken on the plane indicated by the line II—II of such FIG.;

FIG. 3 is a front elevational view of another of the sealing ring elements of the seal mechanism taken on the plane indicated by the line III—III of FIG. 1;

FIG. 4 is an axial sectional view of the sealing ring elements of a slightly modified form of seal mechanism;

FIG. 5 is a front elevational view of the sealing ring elements shown in FIG. 4; and FIG. 6 is a longitudinal sectional view illustrating a further modification of the invention.

The drawing shows two methods of carrying out the invention, but FIGS. 1 to 3, inclusive, show the preferred form.

In this form of the invention, the seal assembly includes a casing 10 which is of sleevelike form and has an inwardly directed wall or flange 11 at one end. The inner surface 12 of this wall is lapped or otherwise smoothly finished and disposed, when mounted with the casing, to extend normal to the longitudinal axis of the shaft to be sealed. This axis is indicated in FIG. 1 by a chain line 14, the shaft being indicated by dotted lines. The casing 10 provides an internal recess 13 for receiving parts of the seal although it should be understood that the seal per se would not necessarily include a casing or a recess.

The recess 13 receives a plurality of sealing ring elements 15, 16 and 17, these, in the preferred form of the invention, being composed of carbon or other material having appropriate frictional and thermal properties. The sealing ring elements, in the forms of the invention shown, are each provided with cylindrical inner and outer surfaces and planar side walls which are smoothly finished, the side walls extending normal to the axis 14 of the shaft.

In one form of the invention, each ring is notched as at 18 at one point in the outer periphery. The ring is then severed by fracturing along a line 19 extending between the inner surface of the ring and the bottom of the notch 18. Two of the rings, namely 15 and 17, have their inner diameters substantially equal to the diameter of the shaft to be sealed so that the rings will closely fit the surface of the shaft when the seal is installed. Ring 16 has its inner diameter closely conforming to the external size and shape of the ring 15 so that the ring 16 may be placed in concentric relationship with the ring 15. This relationship may be maintained either by disposing a pin 20 in registering holes formed in these rings or by radial and axial spring clamping forces provided, for example, by the resiliency of the outer ring itself. When the seal is assembled, rings 15 and 16 are disposed with one side of each in engagement with the surface 12 of the casing flange 11. Ring 17 is disposed in engagement with the opposite sides of the rings 15 and 16. A second pin 21 may be disposed in registering openings formed in rings 15 and 17. Pins 20 and 21 or their equivalent will maintain the sealing rings in their relative positions during the operation of the seal. Other suitable means for maintaining such relative positions may be substituted for the pins if desired. The openings for the reception of the pins are so located that the lines 19 where the rings are fractured will be staggered relative to one another. These lines should be placed as remote from one another as possible to minimize the danger of fluid leakage.

The outer peripheries of rings 16 and 17 are grooved as at 22 for the reception of small tension springs 23 which have their ends connected to provide endless loops. Such springs are frequently referred to as garter springs. They function, in the present instance, to tend to contract the diameters of the sealing rings. They serve to firmly engage the inner surfaces of sealing rings 15 and 17 with the shaft to be sealed. The sealing rings 15 and 16 are maintained in firm engagement with the flange 11 of the casing and with ring 17 by providing the assembly with resilient means in the form of a Belleville spring 24, this element being retained in the casing by a snap ring 25. The spring is engaged with the ring 25 on one side and with an optional force distributing washer 26 disposed between the spring 24 and the ring 17.

In the operation of the device, the shaft will be engaged by the inner surfaces of the rings 15 and 17 which will preclude fluid flow along the shaft in this location. Rings 15 and 16 will tightly engage with the flange 11 and preclude fluid flow in a radial direction between the rings and flange. Rings 15 and 16 will also engage one another, and with ring 17, so tightly that fluid flow between these elements will also be precluded. As the shaft revolves over a predetermined time period, the inner surfaces of rings 15 and 17 will be worn-in to more intimately engage and seal along the shaft. Due to the formation of the rings, from a suitable material having "wearing-in" qualities and one which also serves as a lubricant, a minimum of resistance to turning movement of the shaft will result. By forming the rings of one piece and fracturing each at one point in the circumference, a minimum number of parts will be provided. The fracture will permit the rings to be closely fitted to the shaft and one another, the fracture providing for a more perfect matching of the complemental ends than could be procured in any other manner. By locating the fractures as far apart as possible (120°), any spacing produced thereby will be sealed by the abutting ring to prevent fluid leakage therethrough.

In the second form of the invention illustrated, the sealing rings have similar cylindrical inner and outer surfaces and side surfaces normal to the axis of the shaft to be sealed. In this form of the invention, however, the rings 27 and 28 which engage the shaft are of the same internal and external diameters and the third ring 30 surrounds and is concentric with the other rings. The latter ring may be provided with a groove in its outer periphery to receive a garter spring 31 which tends to contract the rings into firm engagement with the shaft. These rings, as illustrated in FIG. 5, will also be fractured along lines extending between the inner and outer surfaces. These fractures will also be located remotely from one another to minimize the possible paths of fluid leakage. If desired, these rings could be notched as in the first form of the invention. The fractures could also extend along other lines, however, the generally radial lines are preferred. It is recognized that seals having a plurality of interengaging surfaces have previously been provided. The seals forming the subject matter of this invention, however, are preferred due to the minimum number of paths of possible fluid leakage, and the reduced number of parts which contributes to the low cost of fabrication and maintenance.

It should be obvious from the foregoing that the several pieces making up the seal proper could be formed of different materials, some of which may possess inherent resiliency thus eliminating the necessity of providing the garter springs to urged the seal members into firm engagement with the shaft to be sealed.

It is also within the concept of the invention to employ elements with certain features previously shown and described to seal the inner side of a bore 32 as indicated in FIG. 6. In this form of the invention, a plurality of sealing elements or rings 33, 34 and 35 are provided. These elements are also of ring-like form and are applied to a reciprocable element 36 such as a piston. The rings are arranged in a manner similar to that in the first form of the invention, i.e., with two rings superposed and urged into engagement with a smoothly finished wall 37 at one side by another spring pressed ring on the other side, the outer rings engaging the wall of the bore under the influence of expansion springs 38. The rings 33, 34 and 35 are each severed along a single radially extending line as in the other forms of the invention, such lines being disposed in circumferentially spaced relation to one another.

In this modified form of the invention, the rings 33 and 35 will be finished to the diameter of the bore then severed, preferably by fracturing, before application to the piston and insertion in the bore 32.

We claim:

1. Means providing a seal along a cylindrical surface comprising:
    (a) means forming a flat surface normal to the cylindrical surface to be sealed;
    (b) first, second and third sealing bodies arranged substantially concentric with the cylindrical surface, the first and second of said bodies having surfaces conforming to the shape and size of such surface and planar side surfaces normal to the cylindrical surface, said third body having a surface conforming in shape and size to a surface of the first body and said third body superposed on the first body and a planar side surface normal to the cylindrical surface, one side surface of each of the superposed bodies being in engagement with said flat surface, said second body being in engagement with the opposite side surfaces of said first and third bodies, each of said sealing bodies being fractured at a single location only along a substantially radial line extending from the inner surface to the periphery thereof providing intimate interfitting of separated irregular ends produced by the fracture; and
    (c) resilient means urging said sealing bodies toward said cylindrical surface and said flat surface.

2. Means providing a seal for a shaft comprising:
    (a) means forming a flat surface normal to the axis of the shaft to be sealed;
    (b) first, second and third sealing bodies adapted to surround the shaft, the first and second of said bodies having inner surfaces conforming in shape and size to the cross section of the shaft and planar side surfaces normal to the axis of the shaft, said third body having an inner surface conforming in shape and size to the external contour of one of the other bodies and superposed thereon, a side surface of the superposed bodies being in engagement with said flat surface, each of said members being fractured at a single location only along a line extending substantially radially from the inner surface to the periphery thereof providing intimate interfitting of separated irregular ends produced by the fracture;
    (c) resilient means tending to contract said bodies around the shaft; and
    (d) means yieldably urging said bodies toward said flat surface.

3. Means providing a seal for a shaft comprising:
    (a) means forming a flat surface normal to the axis of the shaft to be sealed;
    (b) first, second and third sealing bodies adapted to surround the shaft, the first and second of said bodies having inner surfaces conforming in shape and size to the cross section of the shaft and planar side surfaces normal to the axis of the shaft, said third body having an inner surface conforming in shape and size to the external contour of one of the other bodies and superposed thereon, a side surface of the superposed bodies being in engagement with said flat surface, each of said members being fractured at a single location only along a line extending substantially radially from the inner surface to the periphery thereof providing intimate interfitting of separated irregular ends produced by the fracture;
    (c) means interengaging said bodies for maintaining the same relatively disposed with the lines of severance therein spaced a maximum degree of revolution about the axis of the shaft;

(d) resilient means tending to contract said bodies around the shaft; and
(e) means yieldably urging said bodies toward said flat surface.

4. Means for providing a seal along a shaft comprising:
(a) a casing forming an annular internal recess with a first end wall normal to the axis of the shaft to be sealed;
(b) first, second and third sealing rings in said recess, each sealing ring having cylindrical inner and outer faces and planar side faces, the latter being normal to the axis of the annular recess, the inner faces of the first and second rings having diameters substantially equal to that of the shaft to be sealed, the inner face of said third ring having a diameter substantially equal to the outer diameter of at least one of the other rings, said third ring being concentrically disposed on said one other ring, a side face of two of said rings being in engagement with said first end wall of said casing, each of said rings being fractured at a single location only along a line extending substantially radially from the inner to the outer face thereof providing intimate interfitting of separated irregular ends produced by the fracture;
(c) means extending into adjoining portions of said rings to maintain the same relatively disposed with the fractures therein spaced a maximum degree of revolution about the axis of said recess;
(d) means resiliently tending to diametrically contract said rings; and
(e) means urging said rings toward the first end wall of said casing.

5. Means for providing a seal along a shaft comprising:
(a) a casing forming a first end wall normal to the axis of the shaft to be sealed;
(b) first, second and third sealing rings, each sealing ring having cylindrical inner and outer faces and planar side faces, the latter being normal to the axis of the shaft, the inner faces of the first and second rings having diameters substantially equal to that of the shaft to be sealed, the inner face of said third ring having a diameter substantially equal to the outer diameter of at least one of the other rings, said third ring being concentrically disposed on said one other ring, a side face of two of said rings being in engagement with said first end wall of the casing, each of said rings being fractured at a single location only along a line extending substantially radially from the inner to the outer face thereof providing intimate interfitting of separated irregular ends produced by the fracture;
(c) means projecting into adjoining portions of said rings to maintain the fractures in staggered relationship about the axis of said shaft;
(d) endless spring means extending around the periphery of certain of said rings to tend to diametrically contract the same; and
(e) resilient means urging said rings toward said first end wall of the casing.

6. Means for providing a seal along a shaft comprising:
(a) a casing with a first end wall normal to the axis of the shaft to be sealed;
(b) first, second and thrid sealing rings, each sealing ring having cylindrical inner and outer faces and planar side faces, the latter being normal to the axis of the shaft, the inner faces of the first and second rings having diameters substantially equal to that of the shaft to be sealed, the inner face of said third ring having a diameter substantially equal to the outer diameter of at least one of the other rings, said third ring being superposed on said one other ring, a side face of said superposed rings being in engagement with said first end wall of the casing, each of said rings having a notch at a single location only extending radially thereinto from one face a predetermined distance, the ring being fractured from the bottom of the notch substantially radially to the opposite face to provide intimate interfitting separated irregular ends produced by the fracture;
(c) means projecting into adjoining portions of said rings to maintain the fractures in staggered relationship about the axis of said shaft;
(d) means extending around certain of said rings to tend to reduce the diameter thereof; and
(e) means yieldably urging said rings toward said first end wall of the casing.

7. Means for providing a seal along a shaft comprising:
(a) a casing formed with an end wall normal to the axis of the shaft to be sealed;
(b) a plurality of carbon ring elements, the first of said ring elements having an inner diameter substantially equal to the diameter of the shaft to be sealed, a second ring element having an internal diameter substantially equal to the outer diameter of said first ring element, said first and second ring elements being concentrically arranged and engaged at one side with the end wall of said casing, a third ring element with an inner diameter substantially equal to the diameter of the shaft to be sealed and an outer diameter equal to that of the second ring element, said third ring element being engaged with the side of said first and second ring elements opposite those engaged with said casing end wall, each of said carbon ring elements being fractured substantially radially at a single location only to provide intimate interfitting separated irregular ends;
(c) means engaging said carbon ring elements to maintain the fractures spaced from one another around the axis of the internal recess a maximum extent;
(d) endless resilient elements surrounding the peripheries of said second and third ring elements to tend to close the fractures; and
(e) resilient means tending to urge said carbon ring elements toward said casing end wall.

8. Means providing a seal along a cylindrical surface, comprising:
(a) means forming a flat surface normal to the cylindrical surface to be sealed;
(b) first and second sealing rings arranged substantially concentric with the cylindrical surface and having cylindrical surfaces conforming in diameter thereto for close engagement therewith, said sealing rings having planar side surfaces normal to the cylindrical surface, two side surfaces of said rings being in engagement;
(c) a third sealing ring arranged substantially concentric with the cylindrical surface and said first and second rings, said third ring having a surface conforming to the dimensions of predetermined surfaces of said first and second rings for close engagement therewith, said third sealing ring having planar side surfaces normal to the cylindrical surface, each of said sealing rings being fractured at a single location only along a line extending substantially radially thereacross providing intimate interfitting separated irregular ends; and
(d) resilient means holding said sealing rings together and urging the same toward said cylindrical and flat surfaces.

9. Means providing a seal along a cylindrical surface, comprising:
(a) means forming a flat surface normal to the cylindrical surface to be sealed;
(b) first and second sealing rings arranged substantially concentric with the cylindrical surface and having cylindrical surfaces conforming in diameter thereto for close engagement therewith, one of said rings having a planar side surface normal to the cylindrical surface for engagement with said flat surface, the opposite side of said one ring and one side of the other ring being smooth for close engagement with one another;

(c) a third sealing ring superposed on said first and second rings, the engaging surfaces of said rings being smoothly finished for close engagement, said third ring having a side surface normal to said cylindrical surface for engagement with said flat surface, each of said sealing rings being fractured at a single location only along a line extending substantially radially thereacross providing intimate interfitting separated irregular ends; and (d) resilient means holding said sealing rings together and urging the same toward said cylindrical and flat surfaces.

References Cited by the Examiner

UNITED STATES PATENTS

| 839,900 | 1/1907 | Sparrow | 277—198 X |
| 1,867,656 | 7/1932 | Cooper | 277—198 X |
| 2,448,147 | 8/1948 | Jacobsen | 277—72 |
| 2,867,458 | 1/1959 | Kroekel | 277—142 X |
| 2,885,249 | 5/1959 | Payne | 277—156 X |
| 2,888,286 | 5/1959 | Scheffler et al. | 277—156 |
| 2,908,516 | 10/1959 | Stein | 277—137 |

FOREIGN PATENTS 475,456   4/1929   Germany.

LAVERNE D. GEIGER, *Primary Examiner.*

SAMUEL ROTHBERG, *Examiner.*